(12) United States Patent  
Rebeaud

(10) Patent No.: US 8,171,799 B2
(45) Date of Patent: May 8, 2012

(54) PRESSURE SENSOR WITH A DIAPHRAGM AND DEPTH GAUGE COMPRISING THE SAME

(75) Inventor: Nicolas Rebeaud, Le Mont-sur-Lausanne (CH)

(73) Assignee: The Swatch Group Research and Development Ltd., Marin (CH)

( * ) Notice: Subject to any disclaimer, the term of this patent is extended or adjusted under 35 U.S.C. 154(b) by 67 days.

(21) Appl. No.: 12/818,920

(22) Filed: Jun. 18, 2010

(65) Prior Publication Data
US 2010/0319459 A1    Dec. 23, 2010

(30) Foreign Application Priority Data

Jun. 19, 2009  (EP) .................................... 09163294

(51) Int. Cl.
*G01L 7/08* (2006.01)
(52) U.S. Cl. ................. 73/715; 73/736; 73/716
(58) Field of Classification Search ............. 73/700–756
See application file for complete search history.

(56) References Cited

U.S. PATENT DOCUMENTS

| 3,651,693 A | | 3/1972 | Alinari |
| 3,831,449 A | * | 8/1974 | MacNiel et al. ............... 73/300 |
| 3,990,306 A | * | 11/1976 | Denis .............................. 73/300 |
| 5,303,587 A | * | 4/1994 | Garraffa et al. ................ 73/300 |
| 5,442,962 A | | 8/1995 | Lee |
| 6,016,705 A | | 1/2000 | Baur et al. |
| 6,588,264 B1 | * | 7/2003 | Johnson ...................... 73/146.8 |
| 2005/0155777 A1 | * | 7/2005 | Reilly et al. .................... 169/16 |

FOREIGN PATENT DOCUMENTS

| DE | 19724293 A1 | 12/1998 |
| DE | 10147124 A1 | 4/2002 |
| WO | 01/01098 A2 | 1/2001 |

* cited by examiner

*Primary Examiner* — Andre Allen
(74) *Attorney, Agent, or Firm* — Sughrue Mion, PLLC

(57) ABSTRACT

The invention concerns a pressure sensor (5), particularly for a depth gauge (1), capable of having a high level of precision, owing to sufficient elastic deflection amplitude of the diaphragm (or membrane), while avoiding any risk of plastic deformation. The diaphragm (12) is formed by a flat metal disc. The peripheral region (13) thereof is neither welded nor inset, but it is pre-stressed against a stop strip (25) with a closed, preferably circular contour, and can pivot on the stop strip (25) when the diaphragm bends under the effect of fluid pressure in the pressure chamber (10). The pre-stressing may be achieved via a sealing gasket (21) located opposite the stop strip (25). Between said strip and a central aperture (15), a concave stop surface (20) limits the deflection of the diaphragm (12) and prevents any plastic deformation in the event of excessive pressure. Manufacture of the diaphragm is simple, with a high level of reproducibility, assembly is easy and the seal quality is high.

8 Claims, 2 Drawing Sheets

PRESSURE SENSOR WITH A DIAPHRAGM AND DEPTH GAUGE COMPRISING THE SAME

This application claims priority from European Patent Application No. 09163294.3 filed Jun. 19, 2009, the entire disclosure of which is incorporated herein by reference.

BACKGROUND OF THE INVENTION

The present invention concerns a pressure sensor including a body that has a chamber for receiving a pressurized fluid and a support element around said chamber, a cover secured to the body with a stop strip that has a closed contour in correspondence with the support element for the body, a diaphragm, which is arranged between the body and the cover to seal off the pressure chamber and which can bend under the effect of a difference in pressure between the two sides thereof, with a peripheral region of the diaphragm arranged between said support element and said stop strip, and transmission means, connected to a central region of the diaphragm for transmitting diaphragm deflection data to measuring or indicating means. The invention also concerns a depth gauge containing a pressure sensor of this type.

In pressure sensors used, in particular, in manometers or depth gauges, the diaphragm (also called a "membrane") usually takes the form of a metal disc with concentric corrugations for altering the elastic deflection amplitude. This type of diaphragm can be fixed in the sensor by welding (see for example DE Patent Application No 10147124), but also without welds, for example by clamping, as seen in WO Patent Application No. 01/01098. However, precise manufacture of such diaphragms is quite complicated and the level of reproducibility is not high. Moreover, it is not easy to prevent the diaphragm from undergoing plastic deformation if the sensor is subjected to pressure that exceeds the operating pressure.

It has thus been sought to use flat diaphragms, but the method of securing the diaphragm continues to cause quite significant drawbacks. If the peripheral region of the diaphragm is welded to the sensor structure, this decreases the elastic deformation that the diaphragm can undergo before being plastically deformed; therefore the sensitivity of the sensor is reduced. Moreover, welding introduces different stiffness characteristics for each weld. The resulting diaphragm deflection imprecision evidently reduces the precision of the sensor and, further, makes it difficult to use stop members to prevent plastic deformation of the diaphragm. Securing the diaphragm by insetting it into the sensor structure also leads to some of the aforementioned drawbacks.

We will also mention the possibility of giving a non-welded diaphragm a broad U-shaped profile, with a flat shape surrounded by a vertical edge that cooperates with a sealing gasket. In this case, the diaphragm is quite voluminous, the raised edge is only used for sealing, and, above all, the bends in the U are areas where stresses due to fluid pressure are concentrated, thus limiting the elastic deformation that the diaphragm can undergo prior to entering the plastic domain.

SUMMARY OF THE INVENTION

It is an object of the present invention to create a pressure sensor of simple construction that allows the diaphragm to bend as freely as possible under the fluid pressure, while maintaining a good level of sealing. It is an additional object to prevent the risk of any plastic deformation of the diaphragm within the entire range of pressure that the sensor may have to undergo, even beyond the operating pressure. Another additional object is to allow the sensor to be manufactured simply and assembled easily.

The invention therefore provides a pressure sensor of the type indicated in the above preamble, characterized in that the diaphragm has an approximately flat shape and in that the peripheral region of the diaphragm can pivot on the stop strip when the diaphragm bends under the effect of an increase in the fluid pressure in the pressure chamber. This means, in particular, that the peripheral region of the diaphragm is not rigidly connected to the body or to the cover, by welding or being inset therein, and is thus virtually free to accompany any bending of the diaphragm.

Owing to these features, the diaphragm can have greater elastic deformation for a given pressure than if it were fixed by welding or insertion of its peripheral region. The increased deflection of its central region therefore facilitates transmission to the measuring or indicating means. Omitting a rigid securing system decreases the imprecision generated by the variability of this type of securing system and thus improves the precision of the pressure sensor. Moreover, the flat disc-shaped diaphragm can be manufactured simply and inexpensively, with a high level of precision and reproducibility, for example by cutting a metal sheet.

Preferably, the diaphragm and the stop strip are circular, such that the supporting force of the diaphragm is always uniform along the closed contour of the stop strip.

According to a particularly advantageous embodiment of the invention, opposite the diaphragm, the cover has a stop surface, located between a central aperture in the cover and the stop strip, and designed to retain the diaphragm as soon as the latter has reached a deflection corresponding to a limit pressure. This allows the sensor to be subjected to test pressures that are considerably higher than the maximum operating pressure, as will be explained below, while using a quite flexible diaphragm and thus providing the pressure sensor with a high level of sensitivity, without any risk of plastic deformation of the diaphragm.

Other features and advantages of the invention will appear below in the description of two embodiments of the invention, given by way of non-limiting example with reference to the annexed drawings.

DETAILED DESCRIPTION OF VARIOUS EMBODIMENTS

Figure 1:
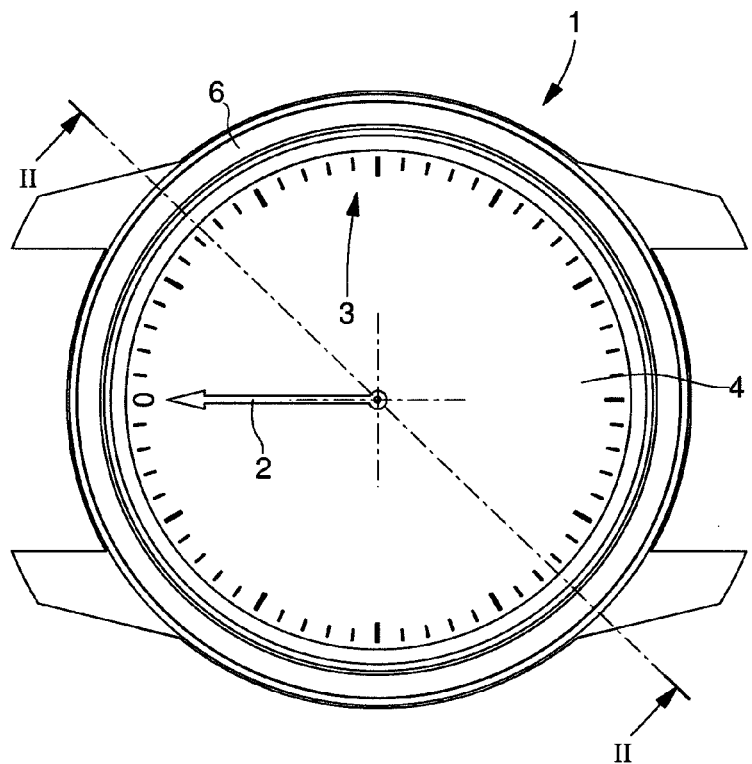
FIG. 1 is a schematic front view of a depth gauge with a pressure sensor according to the present invention.
Figure 2:
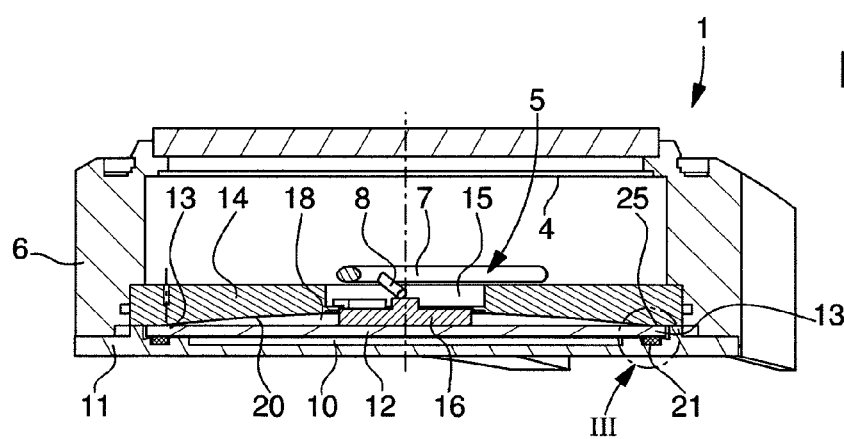
FIG. 2 is a partial schematic cross-section along the line II-II of FIG. 1 and shows a first embodiment of the invention.
Figure 3:
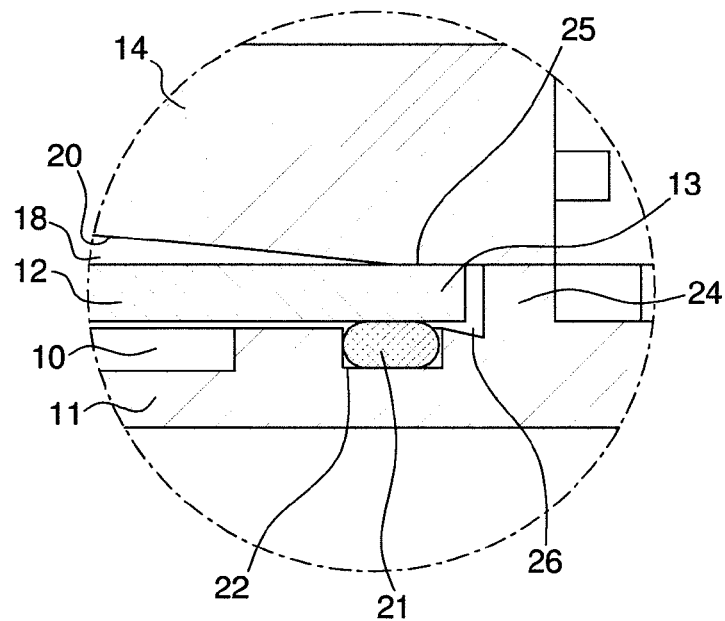
FIG. 3 is an enlarged view of the detail III of FIG. 2.

FIGS. 1 to 3 show schematically a depth gauge 1, to be worn on a diver's wrist, using a strap that is not shown, and for indicating the depth of the water via a hand 2 that rotates opposite a scale 3 of a dial 4, using a pressure sensor 5, housed in the depth gauge case 6. The pressure sensor is connected to hand 2 by a mechanical transmission including, in particular, a rotating arbour 7 with a lateral probe 8. It will be noted that depth gauge 1 can be combined with a watch inside the same case, but this is not indispensable.

Pressure sensor 5 is mounted on a back cover 11 of the case, forming, in general terms, the body of the sensor. The sensor is arranged above a pressure chamber 10 formed in back cover 11 and communicating with the exterior of the case via orifices that are not shown, such that the fluid contained in the chamber is subjected to the pressure prevailing around the depth gauge. Pressure sensor 5 has a flat, circular diaphragm 12, whose peripheral region 13 is held between back cover 11 and a rigid cover 14, which is secured in case 6 and has a central aperture 15. A return spring holds the free end of probe 8 pressed against a spacer 16 fixed in the central region of diaphragm 12. The spacer 16 can move vertically in aperture 15 and can thus pivot arbour 7. Between aperture 15 and peripheral region 13 of the diaphragm, the cover has a slightly concave bottom surface, which delimits a chamber 18 communicating with the rest of the inner volume of case 6 via aperture 15. This concave surface forms a stop surface 20 for limiting the deflection of diaphragm 12 as soon as the latter is subjected to a differential pressure that exceeds a limit pressure, which will be defined below. The inner volume of the case contains air or another gas, at a pressure close to atmospheric pressure at sea level. A sealing gasket 21, preferably an O-ring joint, is compressed against the peripheral region 13 of diaphragm 12 and seals off said inner volume from pressure chamber 10. It also acts as a support element for constantly pressing peripheral region 13 of the diaphragm against cover 14.

As can be seen more clearly in FIG. 3, O-ring joint 21 is housed in a circular groove in back cover 11. A little further in the radial direction, back cover 11 has a vertical edge 24, which abuts against cover 14 and the height of which is selected such that joint 21 is strongly pre-stressed against diaphragm 12, to guarantee the seal between them throughout the entire operating pressure range of the pressure sensor. The compression of joint 21 presses peripheral region 13 of the diaphragm against a part of cover 14, namely, a support strip 25, which follows the edge of concave stop surface 20 and is practically opposite the position of joint 21. Support strip 25 is plane in this example, but it could also have a convex or acute transverse profile. To avoid any adverse effect on the deformation capacity of the diaphragm, the position of joint 21 that forms the support element here must not jut out further than the closed contour of stop strip 25.

The deformations of diaphragm 12 must remain within the elastic domain in the entire range of pressures to which sensor 5 will be subjected. The diaphragm is preferably metallic. Owing to its plane shape at rest, it is easy to manufacture, for example by cutting a stainless steel sheet. The other elements of the sensor, except for O-ring joint 21, can be made of metal or a rigid synthetic material, for example.

When depth gauge 1 is immersed to a certain depth in the water, diaphragm 12 bends elastically under the increased differential pressure between chambers 10 and 18. Pressure sensor 5 detects the deflection of the diaphragm via the vertical movement of spacer 16. The mechanical transmission between probe 8 and hand 2 is arranged to produce a practically linear movement of the hand as a function of the pressure variation.

The shape given to stop surface 20 corresponds to the deformed profile of diaphragm 12 for the aforementioned limit pressure. A spherical cap shape, which is easily to machine, comes close to this profile, which is theoretically parabolic for a circular diaphragm whose deflections are small. Said limit pressure is preferably slightly higher than the maximum operating pressure of the depth gauge. Since the latter generally has to be subjected to a maximum test pressure that is considerably higher than the maximum operating pressure, the main role of stop surface 20 is to prevent any plastic deformation of the diaphragm in these test conditions, since the diaphragm is then supported by cover 14, which is much more rigid than the diaphragm. Only the central part of the diaphragm opposite aperture 15 experiences excess bending, but additional stresses are reduced and, with suitable dimensions, can remain within the elastic domain. Of course, these advantages also exist in cases where the pressure sensor is accidentally subjected to excessive pressure, for example a water hammer in a manometer.

Given that peripheral region 13 of the diaphragm is neither welded nor inset in the structure that supports it, it can pivot almost freely on support strip 25 to tilt and move closer to stop surface 20. In the arrangement of FIG. 3, this movement barely changes the compression force of O-ring joint 21, and thus there is no effect on the seal. A recess 26 is arranged between joint 21 and edge 24 to allow the diaphragm edge to move down unhindered. As regards the assembly of sensor 5, it is clear that this is particularly simple, especially because it only requires inserting cover 14 into case 6, inserting joint 21 into groove 22, placing diaphragm 12, laterally positioned by edge 24, on the joint, and then fixing back cover 11 to the case in the usual manner. It is the height of edge 24 that automatically determines the pre-stress force of joint 21.

Figure 4:
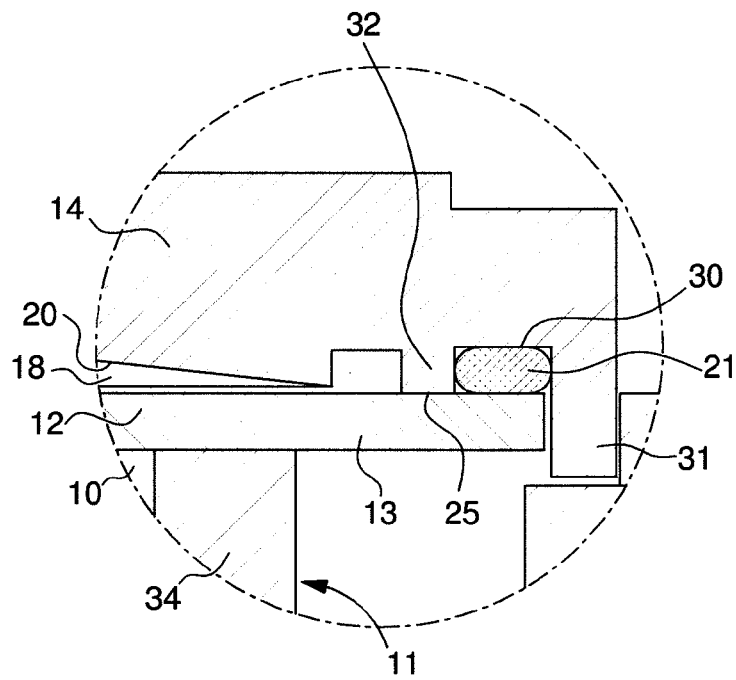
FIG. 4 is a similar view to FIG. 3 and shows another embodiment of the invention.

According to another embodiment of the invention, shown in FIG. 4, diaphragm 12 and the depth gauge mechanism are similar to those of the example of FIGS. 1 to 3, but sealing gasket 21 is placed against the top surface of diaphragm 12, thus on the side of cover 14, in a circular groove 30 between an outer edge 31 and a circular inner edge 32 of the cover. The bottom surface of edge 32 forms stop strip 25 against which the peripheral region 13 of diaphragm 12 permanently abuts. In the pressure sensor rest state, diaphragm 12 is pressed against stop strip 25 by a support element 34 that surrounds pressure chamber 10 and forms part of or is integral with back cover 11. Support element 34 has a circular outline, with a slightly smaller diameter than that of stop strip 25 so as to pre-stress diaphragm 12 elastically against said strip. Further, the thrust of support element 34 on the diaphragm compresses joint 21 (which may also have a toric shape in this example) with a high level of pre-stress, higher than that necessary for the maximum operating pressure. This pre-stress is produced by securing back cover 11 to case 6.

As in the preceding example, the arrangement of FIG. 4 allows unrestricted deformation of diaphragm 12 within the operating pressure range, and supports the diaphragm via stop surface 20 of the cover when the aforementioned limit pressure is exceeded. The pivoting of peripheral region 13 of the diaphragm on stop strip 25 is accompanied by a slight decrease in compression of joint 21, but with no loss of sealing due to the high initial pre-stressing of the joint. In a variant, joint 21 could be placed along the inner side (thus to the left in FIG. 4) of edge 32, such that the compression of the joint increases with the external pressure, but the bending of the diaphragm would then be slightly reduced by resistance due to the joint.

The examples described above show that the invention allows manufacture of pressure sensors, particularly for depth gauges, which are capable of having a high level of precision owing to sufficient elastic deflection amplitude of the diaphragm while avoiding the risk of plastic deformation. This object is achieved with a diaphragm that is simple to manufacture with a high level of reproducibility, and that is easier to assemble while ensuring a high quality seal.

What is claimed is:

1. A pressure sensor including a body with a pressure chamber for receiving a fluid and a support element around said chamber, a cover secured to the body and provided with a stop strip that has a closed contour in correspondence with the support element of the body, a diaphragm, which is arranged between the body and the cover to seal off the pressure chamber, and which bends under the effect of a pressure difference between the two surfaces thereof, with a peripheral region of the diaphragm arranged between said support element and said stop strip, and transmission means, connected to a central region of the diaphragm for transmitting diaphragm deflection data to measuring or indicating means, wherein the diaphragm has a generally flat shape, in that the peripheral region of the diaphragm pivots on the stop strip when the diaphragm bends under the effect of an increase in fluid pressure in the pressure chamber, in that said support element is a sealing gasket mounted on the body and compressed between the body and the peripheral region of the diaphragm to press said peripheral region permanently against the stop strip, and in that the sealing gasket is located opposite the stop strip.

2. The pressure sensor according to claim 1, wherein the diaphragm and the stop strip are circular.

3. The pressure sensor according to claim 2, wherein the diaphragm is formed by a flat metal disc.

4. The pressure sensor according to claim 1, wherein, opposite the diaphragm, the cover has a stop surface located between a central aperture of the cover and the stop strip and shaped in such a way as to retain the diaphragm as soon as the latter reaches a deflection corresponding to a limit pressure.

5. The pressure sensor according to claim 4, wherein the stop surface has the approximate shape of a spherical cap.

6. The pressure sensor according to claim 1, wherein the support element is rigid and in that a sealing gasket is arranged and compressed between the peripheral region of the diaphragm and the cover next to the stop strip.

7. The depth gauge with a case containing a pressure sensor including a body with a pressure chamber for receiving a fluid and a support element around said chamber, a cover secured to the body and provided with a stop strip that has a closed contour in correspondence with the support element of the body, a diaphragm, which is arranged between the body and the cover to seal off the pressure chamber, and which is capable of bending under the effect of a pressure difference between the two surfaces thereof, with a peripheral region of the diaphragm arranged between said support element and said stop strip, and transmission means, connected to a central region of the diaphragm for transmitting diaphragm deflection data to measuring or indicating means, wherein the diaphragm has an approximately flat shape, in that the peripheral region of the diaphragm can pivot on the stop strip when the diaphragm bends under the effect of an increase in fluid pressure in the pressure chamber, in that said support element is a sealing gasket mounted on the body and compressed between the body and the peripheral region of the diaphragm to press said peripheral region permanently against the stop strip, and in that the sealing gasket is located approximately opposite the stop strip.

8. The depth gauge according to claim 7, wherein said pressure sensor body is formed by a back cover of the case.

* * * * *